United States Patent
Yoshida

(10) Patent No.: US 8,780,524 B2
(45) Date of Patent: Jul. 15, 2014

(54) CERAMIC ELECTRONIC COMPONENT AND METHOD OF MANUFACTURING SAME

(75) Inventor: Noritaka Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 64 days.

(21) Appl. No.: 13/394,983

(22) PCT Filed: Mar. 7, 2011

(86) PCT No.: PCT/JP2011/001308
§ 371 (c)(1),
(2), (4) Date: Mar. 8, 2012

(87) PCT Pub. No.: WO2011/111356
PCT Pub. Date: Sep. 15, 2011

(65) Prior Publication Data
US 2012/0176725 A1    Jul. 12, 2012

(30) Foreign Application Priority Data

Mar. 10, 2010    (JP) .................................. 2010-052681

(51) Int. Cl.
| H01G 4/06 | (2006.01) |
| C03C 1/00 | (2006.01) |
| C04B 38/00 | (2006.01) |
| B29C 65/00 | (2006.01) |

(52) U.S. Cl.
USPC ............... 361/321.1; 501/32; 501/80; 264/44

(58) Field of Classification Search
USPC ..................... 361/321.1; 501/32, 80; 264/44
See application file for complete search history.

(56) References Cited

U.S. PATENT DOCUMENTS

2008/0054789 A1    3/2008    Terao et al.

FOREIGN PATENT DOCUMENTS

| JP | 07-144935 | 6/1995 |
| JP | 2002-193691 | 7/2002 |
| JP | 2002193691 A * | 7/2002 |
| JP | 2008-059771 | 3/2008 |
| JP | 2008059771 A * | 3/2008 |

OTHER PUBLICATIONS

International Search Report issued in International Patent Application No. PCT/JP2011/001308 dated Mar. 29, 2011.

* cited by examiner

*Primary Examiner* — Eric Thomas
*Assistant Examiner* — Arun Ramaswamy
(74) *Attorney, Agent, or Firm* — McDermott Will & Emery LLP

(57) ABSTRACT

A ceramic electronic component includes a ceramic sintered body and an electrode provided on a surface of the ceramic sintered body. The electrode contains Ag. The ceramic sintered body contain glass material made of borosilicate glass. The glass material has closed pores and open pores therein. The closed pores and the open pores have diameters decreasing as being located away from the surface of the ceramic sintered body. This ceramic electronic component can prevent delamination of the electrode from the ceramic sintered body during a process of firing a green sheet.

15 Claims, 4 Drawing Sheets

FIG. 2

| Sample No. | 1 | 2 | 3 | 4 | 5 | 6 | 7 | 8 |
|---|---|---|---|---|---|---|---|---|
| Glass (%) | 95 | 95 | 70 | 70 | 95 | 95 | 70 | 70 |
| Filler (%) | 5 | 5 | 30 | 30 | 5 | 5 | 30 | 30 |
| Foaming Agent (Amount) | None | $CaCO_3$ (1%) | $SrCO_3$ (1%) | $SrCO_3$ (1%) | None | $CaCO_3$ (1%) | $SrCO_3$ (1%) | $SrCO_3$ (1%) |
| Firing Temp. (°C) | 800 | 850 | 900 | 950 | 800 | 850 | 900 | 950 |
| Specific Weight (g/cm³) | 2.14 | 1.70 | 1.82 | 1.18 | 2.14 | 1.73 | 1.84 | 1.20 |
| Water Absorption Rate (%) | 0.01 | 0.05 | 0.41 | 3.95 | 0.01 | 0.01 | 0.31 | 3.80 |
| Open Pore Rate (%) | 0.02 | 0.08 | 0.74 | 4.46 | 0.02 | 0.02 | 0.57 | 4.36 |
| Closed Pore Rate (%) | 0.5 | 20.9 | 20.1 | 46.1 | 0.7 | 19.4 | 19.0 | 45.3 |
| Dielectric Constant | 4.1 | 3.3 | 3.4 | 2.5 | 4.1 | 3.3 | 3.4 | 2.6 |
| Firing Atmosphere | Air | Air | Air | Air | $N_2$ Flow | $N_2$ Flow | $N_2$ Flow | $N_2$ Flow |
| Delamination Rate | 1/20 | 0/20 | 0/20 | 2/20 | 0/20 | 19/20 | 15/20 | 20/20 |

# CERAMIC ELECTRONIC COMPONENT AND METHOD OF MANUFACTURING SAME

RELATED APPLICATIONS

This application is the U.S. National Phase under 35 U.S.C. §371 of International Application No. PCT/JP2011/001308, filed on Mar. 7, 2011, which in turn claims the benefit of Japanese Application No. 2010-052681, filed on Mar. 10, 2010, the disclosures of which Applications are incorporated by reference herein.

TECHNICAL FIELD

The present invention relates to a ceramic electronic component having an electrode and a ceramic material, and a method of manufacturing the component.

BACKGROUND ART

In recent years, upon a high-speed interface, such as USB or HDMI, having a higher speed, a measure against radiated noise has been more important. Thus, a common-mode noise, which is a cause of this radiated noise, is removed by a common-mode noise filter. For example, this common-mode noise filter employs ceramic material having a low-dielectric constant for the following reason.

The common-mode noise filter has a structure in which two coils are wound around a dielectric body in the same direction. In general, a current flowing in a coil produces a magnetic field causing a braking effect due to a self-induction. The common-mode noise filter blocks a common-mode noise current from passing therein by using the interaction between the two coils. Specifically, common-mode noise signal currents flows in the two coils in the same direction, and generate magnetic fluxes summed and increased, thereby producing an electromotive force due to the self-induction to provide a higher braking effect, thus preventing the common-mode noise currents from passing.

By moving the two coils to be closer to each other, the magnetic fluxes generated in the coils can be summed and increased to provide the high braking effect, thus providing the common-mode noise filter function in a more favorable manner. However, the two coils moved to be closer to each other causes a large stray capacitance between the coils, which causes a resonance, thus undesirably blocking the passage of a signal current. To prevent this, in order to reduce the distance between the two coils and to reduce the stray capacitance between the coils, a dielectric material around which the coils are wound have a lower dielectric constant.

Furthermore, other high-frequency devices and high-speed signal transmission line substrates also require, as an LTCC material having a high signal propagation velocity and providing an efficient signal transmission, such ceramic materials of dielectric material that have a low dielectric constant. However, even these ceramic materials cannot provide a stable characteristic if the dielectric constant varies. In view of the above, suppressing the variation of the dielectric characteristic of the ceramic material has been desired.

Patent Literature 1 discloses a ceramic electronic component in which pores are provided in a ceramic sintered body using inorganic foaming agent in order to reduce the dielectric constant as well as a manufacture method thereof.

However, in the manufacture method disclosed in Patent Literature 1, since an Ag electrode and a ceramic material have significantly-different shrinkage during a firing shrinkage process, delamination (interface delamination) often occurs at the interface between the Ag electrode and the ceramic material. In general, in order to prevent the Ag electrode and the ceramic material from having an internal stress due to the difference in the shrinkage, the shrinkages of these materials is controlled so as to minimize the difference between the shrinkages in the shrinkage-starting temperature and the shrinkage amount. However, the method of using the foaming agent as described above cannot avoid the expansion of the ceramic material due to the foaming of the foaming agent in the firing shrinkage process, consequently reducing the shrinkage of the ceramic material. Thus, the above method cannot avoid a process causing a significant difference in the shrinkage amount between the Ag electrode and the ceramic material. Specifically, the Ag electrode firstly starts shrinking during firing and then the ceramic material starts shrinking. Then, gas caused by the decomposition of the foaming agent causes the ceramic material to expand during the shrinkage. As a result, the Ag electrode cannot follow the firing shrinkage of the ceramic material, which causes a tensile stress at the surface of the Ag electrode. As a result, delamination is caused at the interface between the Ag electrode and the ceramic material.

CITATION LIST

Patent Literature

Patent Literature 1: Japanese Patent Laid-Open Publication No. 2002-193691

SUMMARY OF THE INVENTION

A ceramic electronic component includes a ceramic sintered body and an electrode provided on a surface of the ceramic sintered body. The electrode contains Ag. The ceramic sintered body contains glass material made of borosilicate glass. The glass material has closed pores and open pores therein. The closed pores and the open pores have diameters decreasing as being located away from the surface of the ceramic sintered body.

This ceramic electronic component can prevent delamination of the electrode from the ceramic sintered body during a process of firing a green sheet

BRIEF DESCRIPTION OF THE DRAWINGS

FIG. 2 illustrates the composition and the property of a ceramic sintered body of the ceramic electronic component according to Embodiment 1 of the invention.

DETAIL DESCRIPTION OF PREFERRED EMBODIMENTS

Exemplary Embodiment 1

Figure 1:
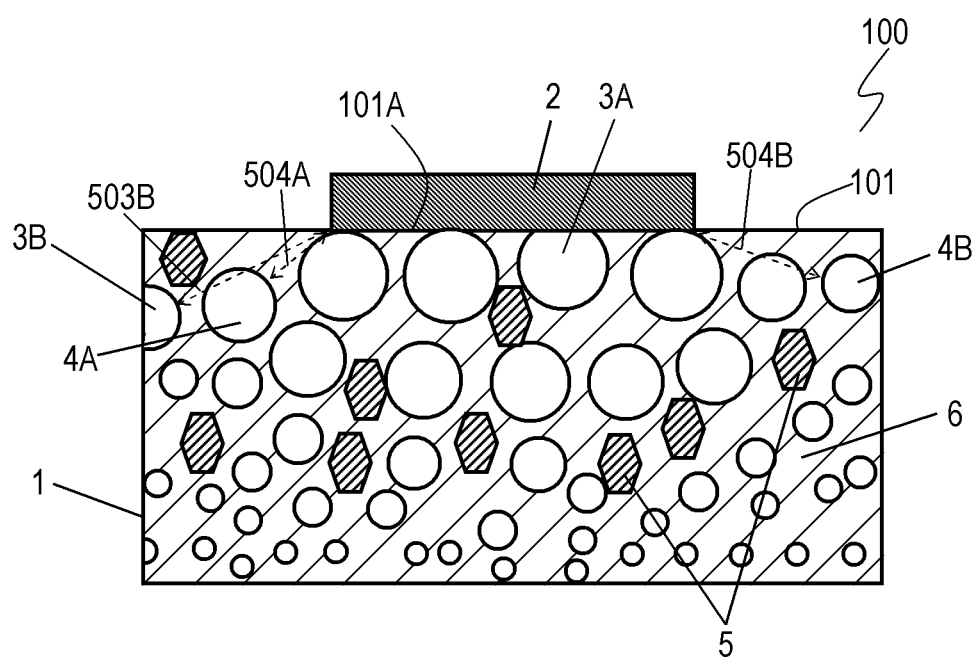
FIG. 1 is a schematic cross-sectional view of a ceramic electronic component according to Exemplary Embodiment 1 of the present invention.

FIG. 1 is a schematic cross-sectional view of ceramic electronic component 100 according to Exemplary Embodiment 1 of the present invention. Ceramic electronic component 100 includes ceramic sintered body 1 and electrode 2 provided on surface 101 of ceramic sintered body 1. Electrode 2 contains Ag. Electrode 2 contacts portion 101A of surface 101 of ceramic sintered body 1. Ceramic sintered body 1 contains glass material 6 made of borosilicate glass and filler 5 dispersed in glass material 6. Glass material 6 of ceramic sintered body 1 has open pores 3A, open pores 3B, closed pores 4A, and closed pores 4B provided therein. Open pores 3A have a diameter larger than that of open pores 3B. Closed pores 4A have a diameter larger than that of closed pores 4B. According to Embodiment 1, a maximum diameter of each of open pores 3A is larger than a maximum diameter of each of open pores 3B. A maximum diameter of each of closed pores 4A is larger than a maximum diameter of each of closed pores 4B. Electrode 2 is configured to function as an electrode of an inductor or a capacitor.

The composition of the borosilicate glass of glass material 6 will be described below.

According to Embodiment 1, glass material 6 is made of borosilicate glass preferably having a crystallization rate of 90% or lower. Crystallized glass having a crystallization rate exceeding 90% has a viscosity which does not decrease so much at a point higher than the softening point, and hence, prevents open pores 3A and 3B as well as closed pores 4A and 4B from being formed, thus causing a risk failing to provide an effect according to the present invention.

Glass material 6 is preferably made of borosilicate glass having a glass composition containing, in addition to $SiO_2$ and $B_2O_3$, at least one of materials selected from $Al_2O_3$, ZnO, alkaline-earth metal oxide, and alkali metal oxide. Glass material 6 preferably contains alkaline-earth metal oxide or alkali metal oxide in particular. Glass material 6 preferably contains substantially no PbO in consideration of an influence on the environment.

Glass material 6 is preferably made of borosilicate glass having a glass deformation point not lower than 550° C. and not higher than 750° C. The glass deformation point lower than 550° C. causes a remarkable deformation of ceramic sintered body 1 during firing and also causes a disadvantage in a process, such as plating, due to a poor chemical resistance of ceramic sintered body 1. The glass deformation point exceeding 750° C. is included in a temperature range within which both of ceramic sintered body 1 and electrode 2 containing Ag can be fired, thus causing ceramic sintered body 1 to have an insufficient density.

The term, "glass deformation point", means a temperature at which glass expansion turns to glass shrinkage during an increase of the glass temperature. The glass deformation point can be calculated by a Thermo Mechanical Analysis (TMA) measurement (measured by TMA8310 made by Rigaku Corporation) using a glass sample having a bar shape.

According to Embodiment 1, the inorganic foaming agent is preferably $CaCO_3$ or $SrCO_3$ but also may be a mixture of $CaCO_3$ and $SrCO_3$. The inorganic foaming agent may be made of any carbonate, nitrate, or sulfate for example so long as the inorganic foaming agent can be decomposed at a temperature ranging from 600° C. to 1000° C. For example, the inorganic foaming agent may be made of, e.g., $BaCO_3$, $Al_2(SO_4)_3$, or $Ce_2(SO_4)_3$. The decomposition-completing temperature of the foaming agent at which the decomposition of the foaming agent is completed preferably ranges from 600° C. to 1000° C. and more preferably from 700° C. to 1000° C. If the decomposition-completing temperature is within this range, gas generated in a temperature rising process during firing is preferably trapped by ceramic sintered body 1.

The decomposition completing temperature is a temperature at which a decrease of the amount of raw powder used as the foaming agent is completed in a thermogravimetry (TG) chart and is obtained by subjecting the raw powder to a simultaneous measurement of Thermogravimetry-Differential Thermal (TO-DTA) (measured by TG8120 by Rigaku Corporation). At this temperature, the decomposition of the foaming agent is completed, and closed pores 4A and 4B as well as open pores 3A and 3B are formed in glass material 6.

The inorganic foaming agent is preferably added in an amount not more than 3 wt. %. The amount of the inorganic foaming agent exceeding 3 wt. % causes the so-called interconnected pores in which most of open pores 3A, open pores 3B, closed pores 4A, and closed pores 4B connected to one another, thereby cause a high water absorption rate, which is not preferable.

According to Embodiment 1, a method of forming electrode 2 is not particularly limited. Thus, electrode 2 may be formed by Ag paste by a generally-use printing method (e.g., screen printing) or also may be formed by an Ag foil using a transfer method. If electrode 2 is formed by a printing method, the Ag paste to be used preferably contains Ag powder having a grain size not larger than 5 μm. The Ag paste having a grain size larger than 5 μm prevents a portion around electrode 2 from having open pores 3A or closed pores 4A having a larger diameter.

According to Embodiment 1, Ag is used as a conductor forming electrode 2. However, ceramic sintered body 1 and alloy, such as Ag—Pt or Ag—Pd, mainly containing Ag may be fired simultaneously Ceramic sintered body 1 and electrode 2 are fired in air. However, the firing is executed more preferably by placing ceramic sintered body 1 having electrode 2 thereon in a furnace to allow air to flow in the furnace to fire ceramic sintered body 1 and electrode 2. The firing in an inert atmosphere or a reducing atmosphere prevents portion 101A contacting electrode 2 from having open pore 3A or closed pore 4A therein having a large diameter, This may fail to provide a strong joint between electrode 2 and ceramic sintered body 1, and may cause a defect around electrode 2.

EXAMPLE (1) Preparing Samples of Ceramic Electronic Component 100

Samples of ceramic electronic component 100 were prepared by the following method.

Figure 3:
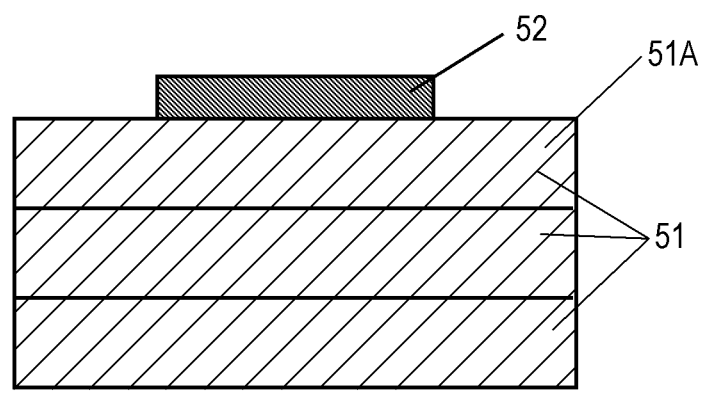
FIG. 3 is a schematic cross-sectional view of the ceramic electronic component according to Embodiment 1 of the invention for illustrating a method of manufacturing the component.

FIG. 2 illustrates the compositions and the properties of the samples of Sample Nos. 1 to 8 of ceramic sintered body 1. FIG. 3 is a schematic cross-sectional view of ceramic electronic component 100 for illustrating the method of manufacturing ceramic electronic component 100.

Ceramic sintered body 1 of Example is made of a low-temperature sintering ceramic having a low dielectric constant that allows a simultaneous firing of ceramic sintered body 1 and electrode 2 made of Ag or an alloy, such as Ag—Pt or Ag—Pd, mainly including Ag.

First, borosilicate glass having a deformation point of 600° C. ($SiO_2$—$B_2O_3$—$Al_2O_3$—MgO—CaO—$K_2O$-based glass), quartz ($SiO_2$) filler, and an inorganic foaming agent ($CaCO_3$ or $SrCO_3$) were mixed at predetermined rates shown in FIG. 2 to prepare each mixture. Then, ceramic green sheets 51 mainly containing the mixture were formed by slurry of the mixture by a doctor blade method.

Next, ceramic green sheets 51 were stacked to prepare ceramic green sheet laminate body 51A. Then, as shown in FIG. 3, conductive material 52 that was Ag paste functioning as electrode 2 was printed on a surface of ceramic green sheet laminate body 51A (ceramic green sheet 51) to be shaped in a meander pattern having a line width of 150 μm. Then, the laminate body was retained for 30 minutes at a predetermined temperature to simultaneously fire conductive material 52 and ceramic green sheet laminate body 51A (ceramic green sheet 51), thereby preparing samples of ceramic electronic component 100 having ceramic sintered body 1 shown in FIG. 1. Twenty samples were prepared for each of Sample Nos. 1 to 8.

(2) Measurement of Dielectric Constant

Electrodes 2 of the samples of ceramic electronic component 100 were ground and removed. Then, surface 101 of ceramic sintered body 1 was a mirror polished. Then, the dry weight of ceramic sintered body 1 after the mirror polishing was measured. Then, ceramic sintered body 1 was subjected to a de-foaming processing in water to measure the underwater weight and the wet weight thereof. Based on the values of these weights, the specific gravity by the Archimedes method was calculated and the water absorption rate was calculated. A closed pore rate and an open pore rate were also calculated. The closed pore rate is a rate obtained by dividing the total of the volumes of all closed pores by the total volume of ceramic sintered body 1. The open pore rate is a rate obtained by dividing the total of the volumes of all open pores by the total volume of ceramic sintered body 1.

The mirror-polished surface of ceramic sintered body 1 was vacuum-sucked by a probe to measure the dielectric constant at 6 GHz by a near-field method.

Ceramic sintered body 1 of Example can be subjected to an integrated simultaneous firing with ferrite for example or one type of ceramic material having a different characteristic.

(3) Measurement of Delamination Rate

The samples of ceramic sintered body 1 were cut in a direction perpendicular to electrode 2, i.e., in a direction perpendicular to surface 101. Then, surfaces obtained by the cutting were polished. Then, the polished surfaces around electrode 2 were observed by a scanning electron microscope to determine whether the samples exhibited delamination or not. FIG. 2 shows the specific gravities, the water absorption rates, the open pore rates, the closed pore rates, and the delamination rates of the samples.

The samples of Sample Nos. 2 to 4 containing a foaming agent exhibit large open pores 3A and closed pores 4B around electrode 2. Delamination caused at ceramic sintered body 1 around electrode 2 does not occur in the twenty samples of Sample No. 2 and the twenty samples of Sample No. 3. The delamination occurs in two samples out of the twenty samples of Sample No. 4. Thus, the delamination rate is very low. Among these samples, the samples of Sample Nos. 2 and 3 exhibit a particularly-superior delamination rate of zero.

On the other hand, the samples of Sample Nos. 6 to 8 were obtained by firing ceramic green sheet 51 functioning as ceramic sintered body 1 in $N_2$ flow. Thus, extremely small amount of Ag diffuses from electrode 2 mainly containing Ag into ceramic sintered body 1. Thus, it is difficult to form a large pore in ceramic sintered body 1 around electrode 2. Delamination was found in nineteen samples out of the twenty samples of Sample No. 6, in fifteen samples out of the twenty samples of Sample No. 7, and in all of the twenty samples of Sample No. 8, thus exhibiting a high delamination rate.

As described above, ceramic electronic component 100 in which ceramic sintered body 1 has large open pore 3A and closed pore 4A around electrode 2 exhibits a low delamination rate around electrode 2.

Electrode 2 is provided on surface 101 of ceramic sintered body 1 or in an inner layer. Closed pores 4A and open pores 3A are formed in glass material 6 composed of borosilicate glass phase. Closed pores 4A and open pores 3A have diameters gradually decreasing as being located away from surface 101 of ceramic sintered body 1.

Large open pores 3A around electrode 2 causes a shrinkage amount in directions along portion 101A of surface 101 of electrode 2 to be forcedly matched with a shrinkage amount of the ceramic green sheet when the ceramic green sheet functioning as ceramic sintered body 1 and electrode 2 are fired. Thus, delamination around electrode 2 can be prevented.

Specifically, large open pores 3A concentrating around electrode 2 allow Ag in electrode 2 to enter into open pores 3A during sintering, and join electrode 2 strongly to the ceramic green sheet against the stress due to the shrinkage, thus preventing delamination.

Open pores 3A and closed pores 4A have diameters (maximum pore diameters) decreasing as being located away from portion 101A contacting electrode 2. The distance between portion 101A and a position in ceramic sintered body 1 is defined by the length of the shortest line segment out of line segments drawn from the position to portion 101A. The distance between portion 101A and open pore 3A is zero. Portion 101A is located away from open pore 3B by distance 503B. Portion 101A is located away from closed pore 4A by distance 504A. Portion 101A is located away from closed pore 4B by distance 504B. Distance 504A is shorter than distance 504B. Distance 504B is shorter than distance 503B. Open pore 3A has a diameter (maximum diameter) larger than the diameter (maximum diameter) of closed pore 4A. Closed pore 4A has a diameter (maximum diameter) larger than the diameter (maximum diameter) of closed pore 4B. Closed pore 4B has a diameter (maximum diameter) larger than the diameter (maximum diameter) of open pore 3B.

The diameters (maximum diameters) of open pores 3A and closed pores 4A may be distributed substantially concentrically about electrode 2. Specifically, a closed pore and an open pore at a position away from portion 101A by distances identical to each other may have average diameters (maximum diameters) identical to each other.

The borosilicate glass powder, the filler, and the inorganic foaming agent were kneaded and molded, thereby preparing a ceramic green sheet. Then, the ceramic green sheet and electrode 2 were fired in air. The inorganic foaming agent has a decomposition-completing temperature is equal to or higher than the deformation point of the borosilicate glass powder.

The inorganic foaming agent contains at least one of $CaCO_3$ and $SrCO_3$.

When the temperature of the ceramic green sheet is increased in order to fire the ceramic green sheet made of glass powder, the powder of filler 5, and the fine powder of the inorganic foaming agent that generates gas by thermal decomposition, the glass softens to a point higher than the glass deformation point and the ceramic green sheet shrinks. Then, the shrinkage proceeds, and the glass melts to be glass molten liquid which then contacts the filler and the foaming agent. The glass molten liquid thermally decomposes the foaming agent to generate gas. This generated gas is preferably trapped inside the ceramic green sheet. On the other hand, electrode 2 formed by Ag paste or an Ag foil already softens. Thus, a slight amount of Ag defuses in the glass of the ceramic green sheet by the firing in air. A portion of the glass in which Ag is diffused has a lower viscosity than a portion of the glass in which Ag is not diffused. Thus, pores generated in the portion in which Ag is diffused are easily coupled and grow to have a large diameter. The portion of the glass in which Ag is diffused is excessively fired when compared with glass at the periphery. Thus, a small amount of gas is generated not only from the foaming agent but also from the glass. This gas also forms pores. Thus, the resultant ceramic sintered body can have a lower dielectric constant.

As described above, open pore 3A and closed pore 4A have diameters decreasing as being located away from electrode 2 substantially concentrically about portion 101A of surface 101 contacting electrode 2. This structure is preferably obtained by positively utilizing the Ag diffusing from electrode 2.

Closed pore 4A is a pore that is provided in ceramic sintered body 1 and that does not communicate with outside of ceramic sintered body 1. Closed pore 4A may be an independent pore independently existing inside ceramic sintered body 1. Closed pore 4A may be an interconnected pore constituted by plural pores connected to each other. Open pore 3A is a pore that partially communicates with outside of ceramic sintered body 1. Open pore 3A may be an independent pore that independently exists. Open pore 3A may be an interconnected pore constituted by plural pores connected to each other.

Ceramic sintered body 1 can be simultaneously fired with electrode 2 made of Ag or mainly containing Ag (e.g., alloy of Ag—Pt, Ag—Pd). Ceramic sintered body 1 is fired simultaneously to electrode 2 in air can securely adhere to electrode 2.

Exemplary Embodiment 2

Figure 4:
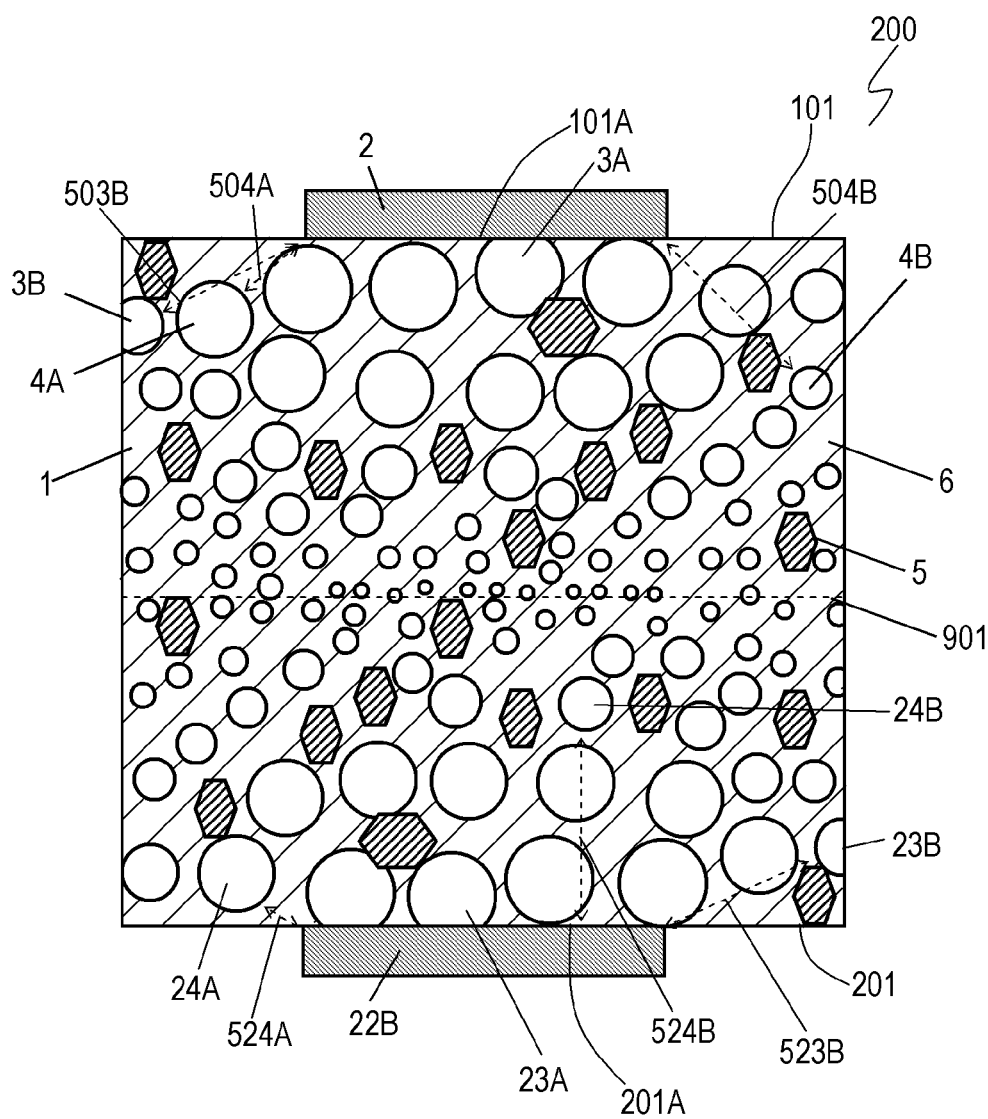
FIG. 4 is a schematic cross-sectional view of a ceramic electronic component according to Exemplary Embodiment 2 of the invention.

FIG. 4 is a schematic cross-sectional view of ceramic electronic component 200 according to exemplary Embodiment 2. In FIG. 4, components identical to those of ceramic electronic component 100 shown in FIG. 1 are denoted by the same reference numerals. Ceramic electronic component 200 shown in FIG. 4 further includes electrode 22B contacting portion 201A of surface 201 opposite to surface 101 of ceramic sintered body 1. Electrode 22B is made of the same material as electrode 2. Glass material 6 of ceramic sintered body 1 has open pores 3A and 3B, open pores 23A and 23B, closed pores 4A and 4B, and closed pores 24A and 24B therein. Open pore 23A opens to portion 201A of surface 201. Open pore 23A has a diameter larger than that of open pore 23B. Closed pore 24A has a diameter larger than that of closed pore 24B. According to Embodiment 2, open pore 23A has a maximum diameter larger than a maximum diameter of open pore 23B. Closed pore 24A has a maximum diameter larger than a maximum diameter of closed pore 24B. Electrodes 2 and 22B are configured to function as electrodes of an inductor or a capacitor.

Electrodes 2 and 22B containing Ag face each other across at least a portion of ceramic sintered body 1. Closed pores 4A and 4B as well as open pores 3A and 3B have diameters gradually decreasing as being located away from surface 101 of ceramic sintered body 1 having electrode 2 thereon toward intermediate portion 901 between surfaces 101 and 201. Closed pores 24A and 24B as well as open pores 23A and 23B have diameters gradually decreasing as being located away from surface 201 of ceramic sintered body 1 having electrode 22B thereon toward intermediate portion 901.

More preferably, closed pores 4A and 4B as well as open pores 3A and 3B have diameters gradually decreasing as being located away from portion 101A of surface 101 of ceramic sintered body 1 contacting electrode 2 toward intermediate portion 901 between electrodes 2 and 22B. Closed pores 24A and 24B as well as open pores 23A and 23B have diameters gradually decreasing as being located away from portion 201A of surface 201 of ceramic sintered body 1 contacting electrode 22B toward intermediate portion 901.

Open pore 23A and closed pore 24A have diameters (maximum diameters) decreasing substantially concentrically about portion 201A contacting electrode 22B as being located away from electrode 22B. Portion 201A is located away from open pore 23A by a distance of zero. Portion 201A is located away from open pore 23B by distance 523B. Portion 201A is located away from closed pore 24A by distance 524A. Portion 201A is located away from closed pore 24B by distance 524B. Distance 524A is shorter than distance 524B. Distance 524B is longer than distance 523B. Open pore 23A has a diameter (maximum diameter) larger than the diameter (maximum diameter) of closed pore 24A. Closed pore 24A has a diameter (maximum diameter) larger than the diameter (maximum diameter) of closed pore 24B. Closed pore 24B has a diameter (maximum diameter) smaller than the diameter (maximum diameter) of open pore 23B.

Open pores 23A and 23B as well as closed pores 24A and 24B have diameters (maximum diameters) that may be distributed substantially concentrically about electrode 22B. Specifically, a closed pore and an open pore at a position away from portion 201A by distances identical to each other may have average diameters, which are averages of diameters (maximum diameters), identical to each other.

INDUSTRIAL APPLICABILITY

A ceramic electronic component according to the present invention prevents delamination of an electrode and is useful for a high-frequency component, such as a filter.

REFERENCE MARKS IN THE DRAWINGS

1 Ceramic Sintered Body
2 Electrode (First Electrode)
3A Open Pore (First Open Pore)
3B Open Pore (First Open Pore)
4A Closed Pore (First Closed Pore)
4B Closed Pore (First Closed Pore)
5 Filler
6 Glass Material
22B Electrode (Second Electrode)
23A Open Pore (Second Open Pore)
23B Open Pore (Second Open Pore)
24A Closed Pore (Second Closed Pore)
24B Closed Pore (Second Closed Pore)
901 Intermediate Portion

The invention claimed is:
1. A ceramic electronic component comprising:
a ceramic sintered body having a first surface; and
a first electrode provided on the first surface of the ceramic sintered body, the first electrode containing Ag,
wherein the ceramic sintered body contains glass material made of borosilicate glass,
wherein the glass material has a plurality of first closed pores and a plurality of first open pores provided therein, and
wherein the plurality of first closed pores and the plurality of first open pores are distributed such that more pores having a larger diameter are arranged closer to the first surface than pores having a smaller diameter.

2. The ceramic electronic component according to claim 1, wherein the first electrode contacts a portion of the first surface of the ceramic sintered body, and the plurality of first closed pores and the plurality of first open pores have diameters decreasing as being located away from the portion of the first surface of the ceramic sintered body.

3. The ceramic electronic component according to claim 1, further comprising
a second electrode provided on the ceramic sintered body, the second electrode containing Ag,
wherein the second electrode is provided on a second surface of the ceramic sintered body, the second electrode facing the first electrode across at least a portion of the ceramic sintered body,
wherein the plurality of first closed pores and the plurality of first open pores are provided between the first surface of the ceramic sintered body and an intermediate portion of the glass material between the first and second electrodes,
wherein the glass material has a plurality of second closed pores and a plurality of second open pores therein between the second surface and the intermediate portion of the glass material,
wherein the plurality of first closed pores and the plurality of first open pores have diameters decreasing as being located away from the first surface of the ceramic sintered body toward the intermediate portion, and
wherein the plurality of second closed pores and the plurality of second open pores have diameters decreasing as located away from the second surface of the ceramic sintered body toward the intermediate portion.

4. The ceramic electronic component according to claim 3, wherein the first electrode contacts a portion of the first surface of the ceramic sintered body, and the plurality of first closed pores and the plurality of first open pores have diameters decreasing as being located away from the portion of the first surface of the ceramic sintered body toward the intermediate portion of the ceramic sintered body between the first and second electrodes, and
wherein the second electrode contacts a portion of the second surface of the ceramic sintered body, and the plurality of second closed pores and the plurality of second open pores have diameters decreasing as being located away from the portion of the second surface of the ceramic sintered body toward the intermediate portion of the ceramic sintered body.

5. The ceramic electronic component according to claim 1, wherein the ceramic sintered body further includes a plurality of fillers dispersed in the glass material.

6. A method of manufacturing a ceramic electronic component, comprising:
providing a ceramic green sheet by mixing borosilicate glass powder with inorganic foaming agent and molding the mixed glass powder, the inorganic foaming agent having a decomposition-completing temperature equal to or higher than a deformation point of the borosilicate glass powder;
providing a conductive material containing Ag on the ceramic green sheet; and
firing the ceramic green sheet and the conductive material in air.

7. The method according to claim 6, wherein the inorganic foaming agent contains at least one of $CaCO_3$ and $SrCO_3$.

8. The method according to claim 6, wherein said providing the ceramic green sheet comprises providing the ceramic green sheet by mixing the borosilicate glass powder with filler and the inorganic foaming agent and molding the mixed glass powder.

9. The method according to claim 6, wherein the ceramic green sheet and the conductive material are fired in air such that more pores having a larger diameter are arranged closer to an interface between the ceramic green sheet and the conductive material than pores having a smaller diameter.

10. The method according to claim 6, wherein the decomposition-completing temperature ranges from 600° C. to 1000° C.

11. The method according to claim 6, wherein the inorganic foaming agent is added in an amount not more than 3 wt. %.

12. The method according to claim 6, wherein the deformation point of the borosilicate glass powder is not lower than 550° C. and not higher than 750° C.

13. The method according to claim 6, wherein the decomposition-completing temperature ranges from 700° C. to 1000° C.

14. The ceramic electronic component according to claim 1, wherein a portion of the first electrode enters into at least one of the plurality of first open pores.

15. The ceramic electronic component according to claim 1, wherein the first electrode further contains Pt or Pd.

* * * * *